(No Model.)
H. S. PFEIL.
TANG END JAW.
No. 472,392. Patented Apr. 5, 1892.
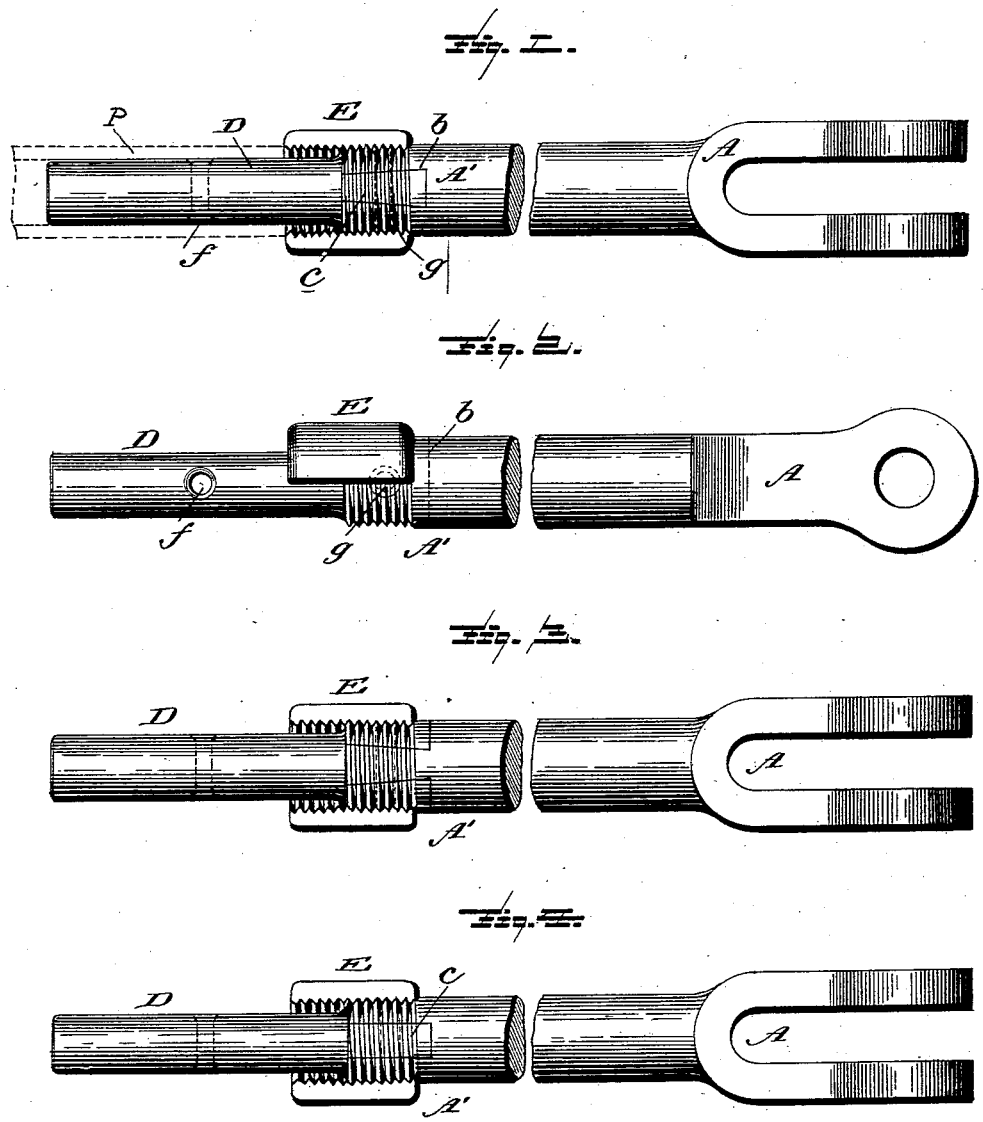
Witnesses
L. C. Hills.
Inventor
Henry S. Pfeil
his Attorney

UNITED STATES PATENT OFFICE.

HENRY S. PFEIL, OF PHILADELPHIA, ASSIGNOR OF ONE-HALF TO THE NATIONAL SWITCH AND SIGNAL COMPANY, OF EASTON, PENNSYLVANIA.

TANG-END JAW.

SPECIFICATION forming part of Letters Patent No. 472,392, dated April 5, 1892.

Application filed August 3, 1891. Serial No. 401,513. (No model.)

*To all whom it may concern:*

Be it known that I, HENRY S. PFEIL, of Philadelphia, in the county of Philadelphia and State of Pennsylvania, have invented a new and Improved Tang-End Jaw for use in Railway Switch and Signal Connections, of which the following is a specification.

In a railway switch and signal apparatus the various operative parts of switch and signal mechanism are connected to the levers in the tower or cabin by hollow rods or pipes, which pipes are joined to the levers, slides, and other operative parts by jaws, which are pinned to the parts and secured by their tail-pieces to the pipes. The connection between the jaw and the pipe must be a rigid one, and this result has been secured in several ways—as, for example, by welding the two together or by providing a mechanical coupling of some approved kind.

It is my object to avoid the necessity of welding, which is troublesome and expensive, and to provide in lieu thereof a secure and simple mechanical joint, which will be stiff and permanent.

To this end my invention resides in an improved construction of the jaw, which can best be explained and understood by reference to the accompanying drawings, in which—

Figure 1 is a view of the jaw with the jaw proper in side elevation. Fig. 2 is a like view of the same with the jaw proper in plan. Figs. 3 and 4 are views of modifications hereinafter more particularly referred to.

A is the jaw proper, and A' is its shank or tail-piece. In the rear end of the shank is a transverse undercut slot $b$.

D is a tang, which on its front end has a dovetail tenon $c$, adapted to enter and fill the slot $b$.

Upon the slotted cylindrical end of the shank A', as well as upon the side edges of the tenon $c$, which fill out and complete this cylindrical end, is formed a screw-thread upon which is designed to screw a sleeve E, internally screw-threaded throughout its length, which length is sufficient, also, to enable it to receive the screw-threaded end of the pipe P (shown in dotted lines in Fig. 1) to be secured to the jaw. The tang D is of sufficiently less diameter than the sleeve to permit the pipe to enter between it and the sleeve, and it forms a plug, which enters and fills the bore of the pipe when the latter is screwed home in the sleeve, as indicated in Fig. 1. After the pipe is thus in place it is made fast by a rivet, which passes through the pipe and a rivet-hole $f$ in the tang. The slotted end of the shank A' is similarly secured to the tenon $b$ by a rivet $g$. Instead of forming the tenon on the tang and the slot in the jaw-shank, the tenon can be on the jaw-shank, and the slot can be in the tang-end, as shown in Fig. 3. In this construction the slotted end of the tang is enlarged to correspond in diameter to the slotted end of the shank in Fig. 1. The screw-threading, as before, is on the slotted end and on the exposed edges of the tenon. Instead of making the tenon and slot dovetail, they can be made plain or with parallel faces, as shown in Fig. 4.

An advantage which may be noted of the construction above described is that thereby I am enabled to make the plug or tang-end of malleable iron, (which cannot be used for the jaw itself,) thus cheapening the device.

What I claim, and desire to secure by Letters Patent, is—

The herein-described tang-end jaw, consisting of the jaw proper A and shank A', and the tang D, united to the shank by a slot-and-tenon connection and a rivet passing through the slotted end of the one and the tenon of the other, both the slotted end and the exposed edges of the tenon filling the slot being screw-threaded to receive the coupling-sleeve E, as shown and set forth.

In testimony whereof I affix my signature in presence of two witnesses.

HENRY S. PFEIL.

Witnesses:
JOHN BRUNNER,
EDGAR TAYLOR.